E. N. HAMMOND.
Lath-Bundling Machine.

No. 220,973. Patented Oct. 28, 1879.

Witnesses
Fred G. Dieterich
George Binkenburg

Inventor
Edwin N. Hammond,
pr. C. A. Snow & Co.
Attorneys.

UNITED STATES PATENT OFFICE.

EDWIN N. HAMMOND, OF MAPLE VALLEY, MICHIGAN.

IMPROVEMENT IN LATH-BUNCHING MACHINES.

Specification forming part of Letters Patent No. 220,973, dated October 28, 1879; application filed September 5, 1878.

*To all whom it may concern:*

Be it known that I, EDWIN N. HAMMOND, of the town of Maple Valley, in the county of Montcalm and State of Michigan, have invented certain new and useful Improvements in Lath-Bunching Machines; and I do hereby declare that the following is a full, clear, and exact description of the invention, which will enable others skilled in the art to which it appertains to make and use the same, reference being had to the accompanying drawings, which form a part of this specification.

Figure 1:
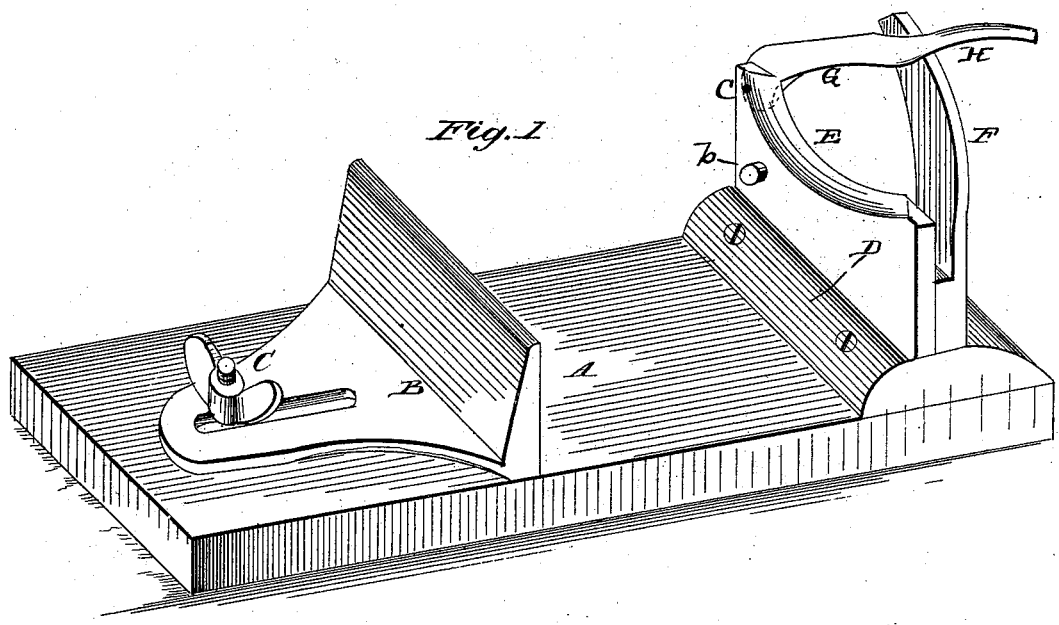
Figure 2:
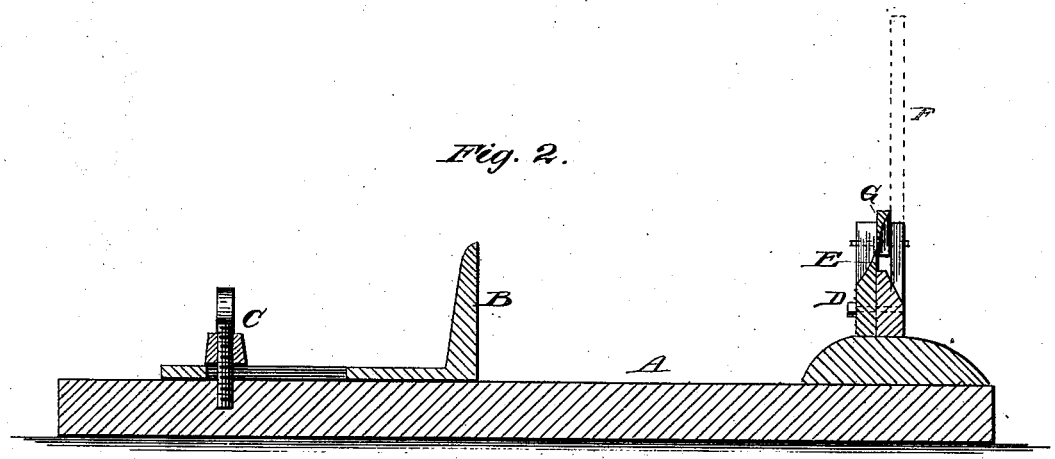

Figure 1 is a view, in perspective, of a device embodying the improvements in this invention; and Fig. 2 is a longitudinal vertical sectional view of the same.

The object of this invention is to devise a simple means for bundling laths; and the novelty consists in the combination and arrangement of the parts, as will be hereinafter more fully set forth and specifically claimed.

In the annexed drawings, forming a part of this specification, the letter A represents the base or platform, which is provided at its outer end with the adjustable gage B, operated by a set-screw, C. This gage B is of the same width as the base A, and is of sufficient height to prevent the laths while being bundled from passing over the same.

At the front end of the platform A is a raised chair, D, to which the fixed knife E, with the concave cutting-edge, is secured by screws and bolts. The head *b* of the bolt at the farther end from the operator serves the purpose of a stop for the laths, and materially assists in preventing the laths from rolling or falling over the side while arranging them in position for bundling.

The forward end of the knife E is extended, forming an elevated arm, *c*, for the pivoted convexo-concave knife G. The elevated arm *c*, above the cutting-surface of the fixed cutter, gives space, leverage, and power to the pivoted knife, and at the same time presents an oval or oblong opening for confining the twine between the knives while acted upon. The cut of the knives is similar to that of a shear.

At the front or inner end of the cutter E, and parallel therewith, is arranged a curved arm, F, secured in an upright position, substantially as shown in Fig. 1 of the drawings. The curved portion of this arm extends upwardly and inwardly in the direction of the knives—in other words, overlaps a portion of the fixed knife in a parallel line. The pivoted knife G is provided with a handle, H, extending beyond the curved arm, for operating the same. This curved arm F also acts as a guide for the vertical movement of the pivoted knife, so as to bring it in direct contact with the stationary knife.

The bundle or cable of tarred twine to be cut is placed outside the chair D, and its end is drawn over the knife E and under the knife G toward the gage. The laths to be bundled are placed upon base A, between the gage and the vertical wall of the knife E, acting also as a guide. One end of the laths resting upon the raised chair leaves a space between the base and laths for the passage of the twine, after which the twine is cut conveniently to the proper length by the knives. The curved arm F prevents the bundle or cable of twine from receding from the cutters, and thus insures a clear shear-cut.

What I claim as my invention is—

A device for bundling laths, consisting, essentially, of a platform, an adjustable gage, a raised chair, a fixed concave knife, a pivoted convexo-concave knife, and a curved arm, all combined substantially as described.

In testimony that I claim the foregoing as my own I have hereto affixed my signature in presence of two witnesses.

EDWIN N. HAMMOND.

Witnesses:
ALEXANDER GLEASON,
JOHN LEWIS.